United States Patent
Spenser et al.

(10) Patent No.: US 6,839,600 B2
(45) Date of Patent: Jan. 4, 2005

(54) PROJECT ORGANIZATION AND DISSEMINATION SYSTEM FOR MACHINE PROGRAMMING AND CONTROL SYSTEMS

(75) Inventors: Kenneth V. Spenser, Ann Arbor, MI (US); Michael Schoonmaker, Dexter, MI (US); Lee Reid, Ann Arbor, MI (US); James B. Behm, Ann Arbor, MI (US); Kurudi Muralidhar, Novi, MI (US); Andrew H. McMillan, Dearborn, MI (US)

(73) Assignee: Entivity, Inc., Ann Arbor, MI (US)

( * ) Notice: Subject to any disclaimer, the term of this patent is extended or adjusted under 35 U.S.C. 154(b) by 74 days.

(21) Appl. No.: 10/187,880

(22) Filed: Jul. 2, 2002

(65) Prior Publication Data

US 2003/0041051 A1 Feb. 27, 2003

Related U.S. Application Data

(60) Provisional application No. 60/302,493, filed on Jul. 2, 2001.

(51) Int. Cl.[7] ............................................. G05B 19/62
(52) U.S. Cl. .......................... 700/86; 700/17; 700/18; 700/83; 700/87; 700/88; 700/181; 717/113
(58) Field of Search ............................. 700/17, 18, 83, 700/86, 87, 88, 89, 181; 717/113

(56) References Cited

U.S. PATENT DOCUMENTS

| | | | | |
|---|---|---|---|---|
| 5,453,933 A | * | 9/1995 | Wright et al. | 700/181 |
| 6,108,662 A | * | 8/2000 | Hoskins et al. | 707/102 |
| 2003/0014322 A1 | * | 1/2003 | Kreidler et al. | 705/26 |
| 2003/0023336 A1 | * | 1/2003 | Kreidler et al. | 700/108 |

* cited by examiner

Primary Examiner—Ramesh Patel
(74) Attorney, Agent, or Firm—Harness, Dickey & Pierce P.L.C.

(57) ABSTRACT

A project organization and dissemination system for a machine programming and control system includes a project development environment that communicates with a distributed communications system. The project development environment includes project tools for designing project elements. The project tools include a control logic module that generates and edits flowchart project elements that include flowchart blocks and contain control logic for operating a device to further a process. A project archival system communicates with the distributed communications system and stores the project elements. A web enabled device communicates with the distributed communications system and allows remote access to the project elements. Other project elements include human machine interface (HMI), databases, network layout, electrical and electromechanical devices, spatial arrangement, process logic and flow, and/or facility layout and design.

20 Claims, 9 Drawing Sheets

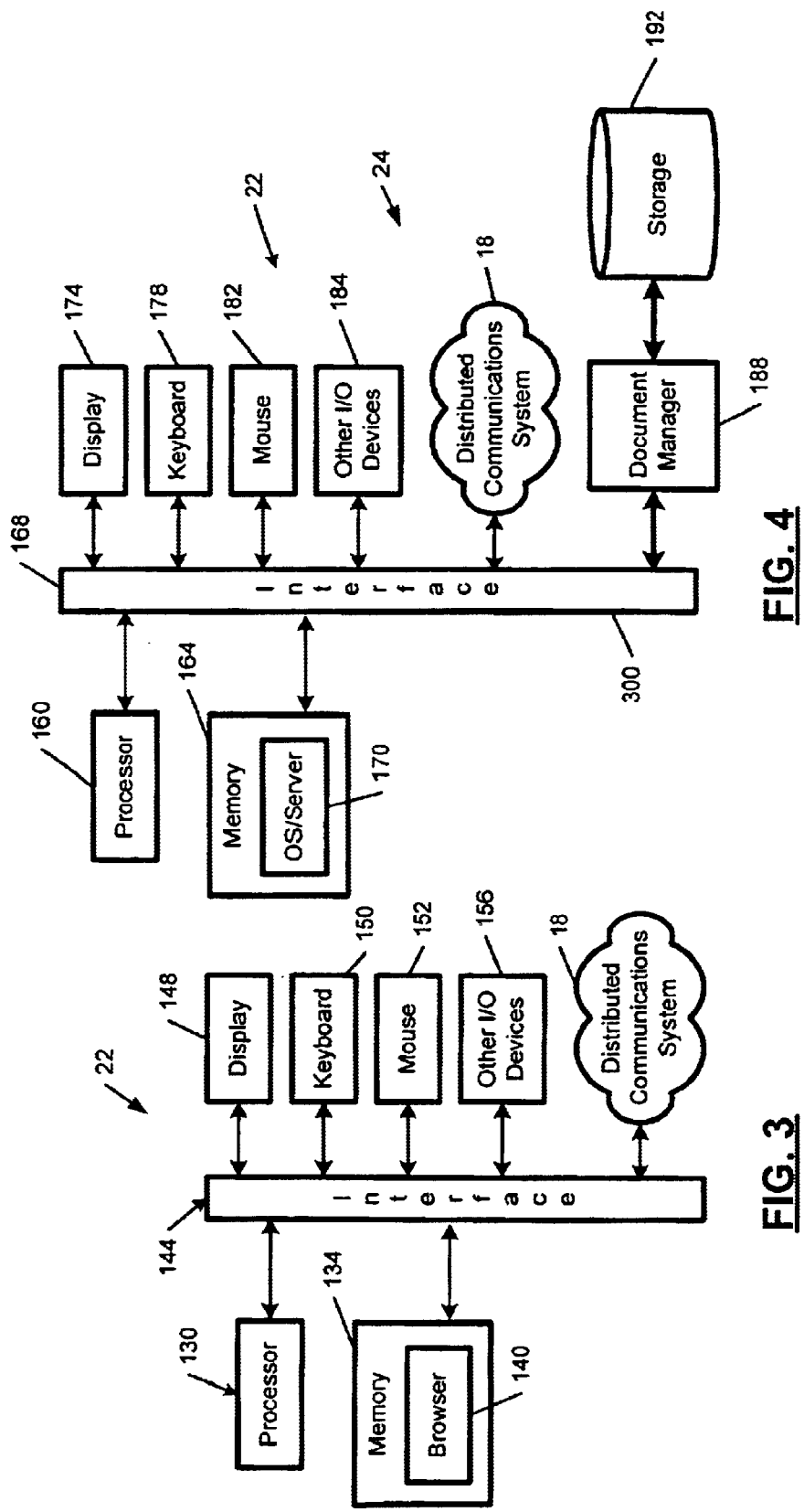

PROJECT ORGANIZATION AND DISSEMINATION SYSTEM FOR MACHINE PROGRAMMING AND CONTROL SYSTEMS

CROSS-REFERENCE TO RELATED APPLICATIONS

This application claims the benefit of U.S. Provisional Application No. 60/302,493, filed Jul. 2, 2001, which is hereby incorporated by reference.

FIELD OF THE INVENTION

The present invention relates generally to machine programming and control systems, and more particularly to a project organization and dissemination system for machine programming and control systems.

BACKGROUND OF THE INVENTION

Machine programming and control systems are generally used for controlling processes that involve devices such as relays, motors, solenoids, valves, switches and other electrical and electromechanical devices. Exemplary processes include machining, drilling, welding, material handling, and material assembly. Generally the machine programming and control systems are operated according to predefined control logic such as flowcharts, ladder diagrams, and/or relay ladder logic. A typical machine programming and control project often includes other design elements such as operator screens, simulation logic, facilities layout, network design, process flow, database design, and other related information.

Multiple developers are often involved in the design testing and review of the machine programming and control project. Oftentimes, the project developers are associated with different organizations within a company and/or with different companies. These developers often need to send copies of a complete project to one another, to new developers involved in the project, and/or to individuals who may or may not be involved in the design of the project. Collection of all of the different elements of the project can be difficult particularly when the project elements are located on different machines. Once collected, it is also difficult to transmit these documents over distributed communication systems such as the Internet due to the size and number of project elements that are associated with the project.

SUMMARY OF THE INVENTION

A project organization and dissemination system for a machine programming and control system includes a project development environment that includes project tools for designing project elements. The project tools include a control logic module that generates and edits flowchart project elements that include flowchart blocks and contain control logic for operating a device to further a process. A project archival system communicates with a distributed communications system and stores the project elements. A web enabled device communicates with the distributed communications system and allows remote access to the project elements.

In other features of the invention, the project tools further comprise an operator screen design module for designing human machine interface (HMI) project elements to assist an operator. A database design module adds, inserts, deletes and queries database project elements using data generated by the flowchart project elements. A network design module designs network layout project elements. A machine design module designs at least one of electrical and electromechanical device project elements. A work area layout module prepares spatial arrangement project elements for devices, materials, and other objects. A process flow module creates process logic and flow project elements. A facilities layout module creates facility layout and design project elements.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a functional block diagram of the web-enabled device of FIG. 1;

FIG. 4 is a functional block diagram of the web server of FIG. 1;

DETAILED DESCRIPTION OF THE PREFERRED EMBODIMENT

Figure 1:
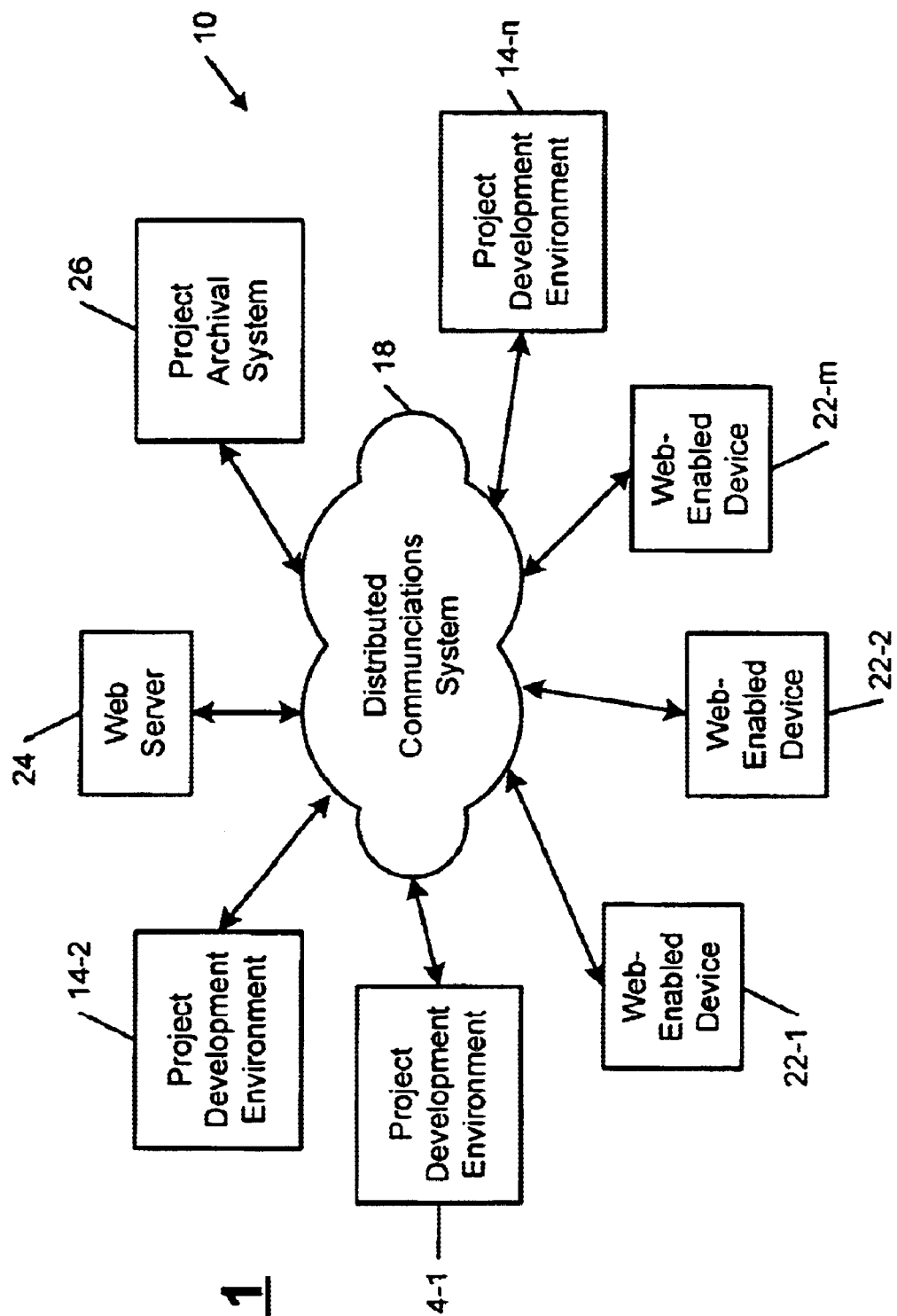
FIG. 1 is functional block diagram illustrating a project organization and dissemination system for a machine programming and control system.

The following description of the preferred embodiment(s) is merely exemplary in nature and is in no way intended to limit the invention, its application, or uses. For purposes of clarity, the same reference numbers will be used in the drawings to identify similar elements.

Referring now to FIG. 1, a project organization and dissemination system 10 is illustrated. The project organization and dissemination system 10 includes one or more project development environments 14-1, 14-2, . . . , 14-n that are connected to a distributed communications system 18. The project development environment 14 can be connected to the distributed commination system in any conventional manner including cables (fiberoptic and coaxial), radio frequency (RF), satellite systems, or any other terrestrial-based connection systems. The distributed communications system 18 can be the Internet, a wide area network, a private network, a local area network, or other suitable system.

One or more web-enabled devices 22-1,22-2, . . . , 22-m are connected to the distributed communication system 18. One or more web servers 24 are likewise connected to the distributed communication system 18. A project archival system 26 is also connected to the distributed communication system 18.

Figure 2:
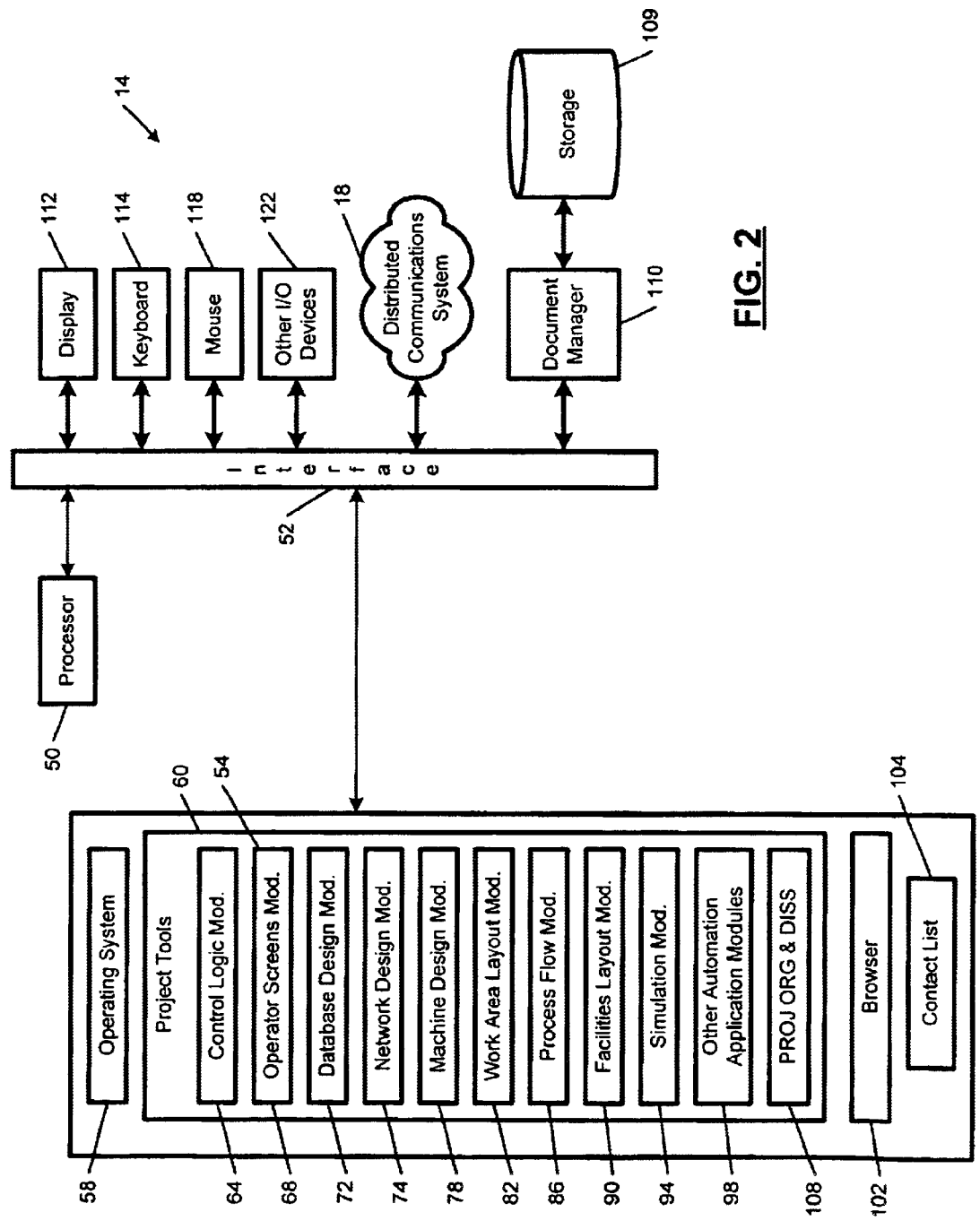
FIG. 2 is a functional block diagram of the project development environment of FIG. 1.

Referring now to FIG. 2, the project development environment 14 is illustrated in further detail and includes a processor 50 and memory 54. The memory 54 includes read-only memory (ROM), random access memory (RAM), and other suitable storage such as hard drives, floppy drives, optical drives, etc. An operating system 58 is loaded into the memory 54 during use. Project tools 60 include a control logic module 64 that allows the project participants to define the control logic that is used to control one or more devices that are associated with the process. In a preferred mode, the control logic module 64 generates flowcharts that include logic blocks such as enable blocks, action blocks and decision blocks.

An operator screen design module 68 allows the project participants to design human machine interfaces (HMI) to assist an operator. A database design module 72 provides a graphical user interface (GUI) including conventional pull-down menus and toolbars that allow the project participants to add, insert, delete and query databases using data generated by the control logic. A network design module 74 provides a GUI that allows a network to be designed and laid out and includes network-based stencils. A machine design module 78 provides a GUI that allows electrical and electromechanical devices to be designed. A work area layout module 82 provides a GUI that allows the arrangement of devices, materials, and other objects to be spatially arranged. A process flow module 86 provides a GUI that allows process logic and flow to be designed. A facilities layout module 90 provides a GUI that allows facilities to be laid out and designed. A simulation module 94 provides a GUI that simulates the process inputs and outputs to test the control logic. Additional automation application modules 98 can also be provided. The GUI's of the modules preferably have the same look and feel to allow a developer to use various modules without needing to learn a new interface.

A browser 102 provides an interface to the distributed communications system 18 in a conventional manner. The browser 102 preferably includes and/or accesses a contact list organizer 104. A project organization and dissemination module 108 organizes project elements that are generated by the project tools 60 as they are created and edited. The project organization and dissemination module 108 compresses projects for transmission via the distributed communications system 18. A storage device 109 stores the project elements. The storage device 109 can be integrated with the memory 54. Alternately, the storage device can be accessed through a local area network or a wide area network. A document manager 110 manages access to the project elements stored in the storage device 109. The project development environment 14 further includes a display 112, a keyboard 114, a mouse 118, and other input/output (I/O) devices 122 such as a printer, scanner, etc.

Referring now to FIG. 3, the web-enabled device 22 is illustrated in further detail. The web-enabled device 22 includes a processor 130 and memory 134. The memory 134 includes RAM, ROM, and/or other electronic storage such as those described above. The memory 134 loads a browser 140 during use. The processor 130 and the memory 134 are connected to an I/O interface 144. The web-enabled device 22 further includes a display 148, a keyboard 150, a pointing device such as a mouse 152, and other I/O devices 156.

Referring now to FIG. 4, the web server 24 of FIG. 1 is illustrated in further detail and includes a processor 160, memory 164 and an I/O interface 168. The memory 164 includes RAM, ROM, and/or other electronic storage such as those described above. In operation, the memory 164 contains an operating system/server module 170. The web server 22 includes a display 174, a keyboard 178, a mouse 182, and other I/O devices 186 such as printers, scanners, etc. A document manager 188 is connected to a storage device 192 that can be integrated with the memory 164. Alternately the storage device 192 can be accessed through a local area network or a wide area network. The document manager 188 provides access to the projects that are stored in the storage device 192. The document manager 188 employs a security protocol such as passwords or other suitable security if desired. In a preferred mode, the projects are stored in a compressed format and are accessed using file transfer protocol (FTP).

Figure 5:
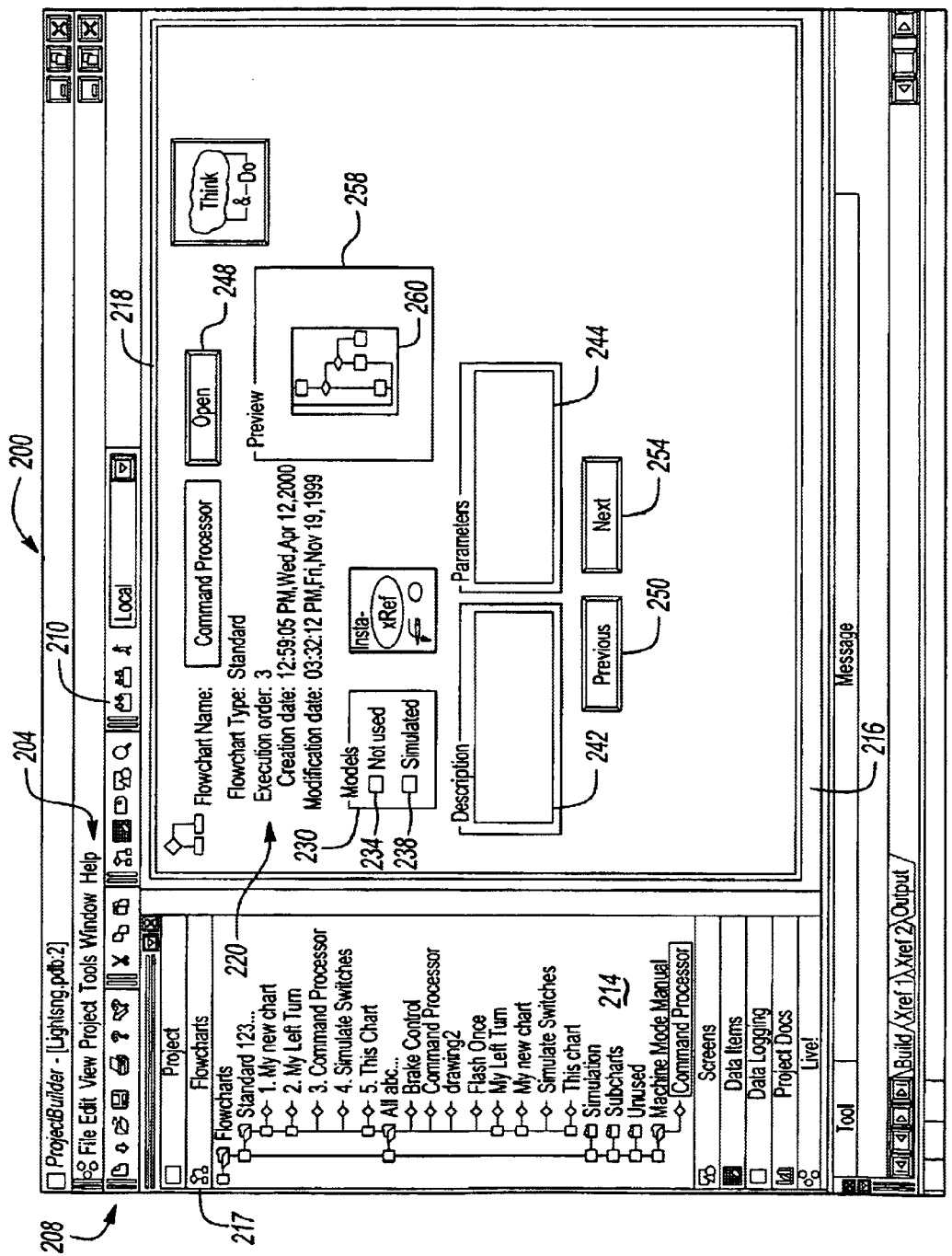
FIG. 5 illustrates a "Flowchart" view of a project organization and dissemination module.

Referring now to FIG. 5, the project organization and dissemination system 10 is illustrated in further detail. The project organization and dissemination module 108 provides a user interface 200 that includes a conventional pull down menu 204 and a conventional tool bar 208 that contains a plurality of tools 210. A navigation frame 214 provides a tree-like, hierarchical interface for accessing the project elements.

In FIG. 5, a "Flowchart" view 216 is selected. The "Flowchart" view is launched by checking on a command button 217. The flowchart view 216 contains flowchart elements such as flowcharts, simulations, subcharts, and other related elements and documents. The project elements and documents are arranged in folders and subfolders. When a project element or document is highlighted using the keyboard 114 and/or the mouse 118, a description frame 218 provides details that relate to the selected element. The details are displayed in text boxes that are generally designated 220. The text boxes 220 contain details that vary according to the project element selected. For example, when a flowchart is displayed, a flowchart type, execution order, creation date and modification date are displayed.

A "Modes" frame 230 contains a first check box 234 for identifying the flowchart as one that is not used. A second check box 238 indicates that the flowchart is simulated. A description text box 242 allows a project participant to describe the flowchart. A parameters text box 244 allows the project participant to describe the parameters that are associated with the flowchart. A command button 248 allows the user to open the flowchart using the control logic module 64. A command button 250 selects a previous flowchart. A command button 254 selects a next flowchart. A preview frame 258 and an image box 260 provide a thumbnail preview of the selected project element (for example a flowchart is shown in the image box 260).

Figure 6:
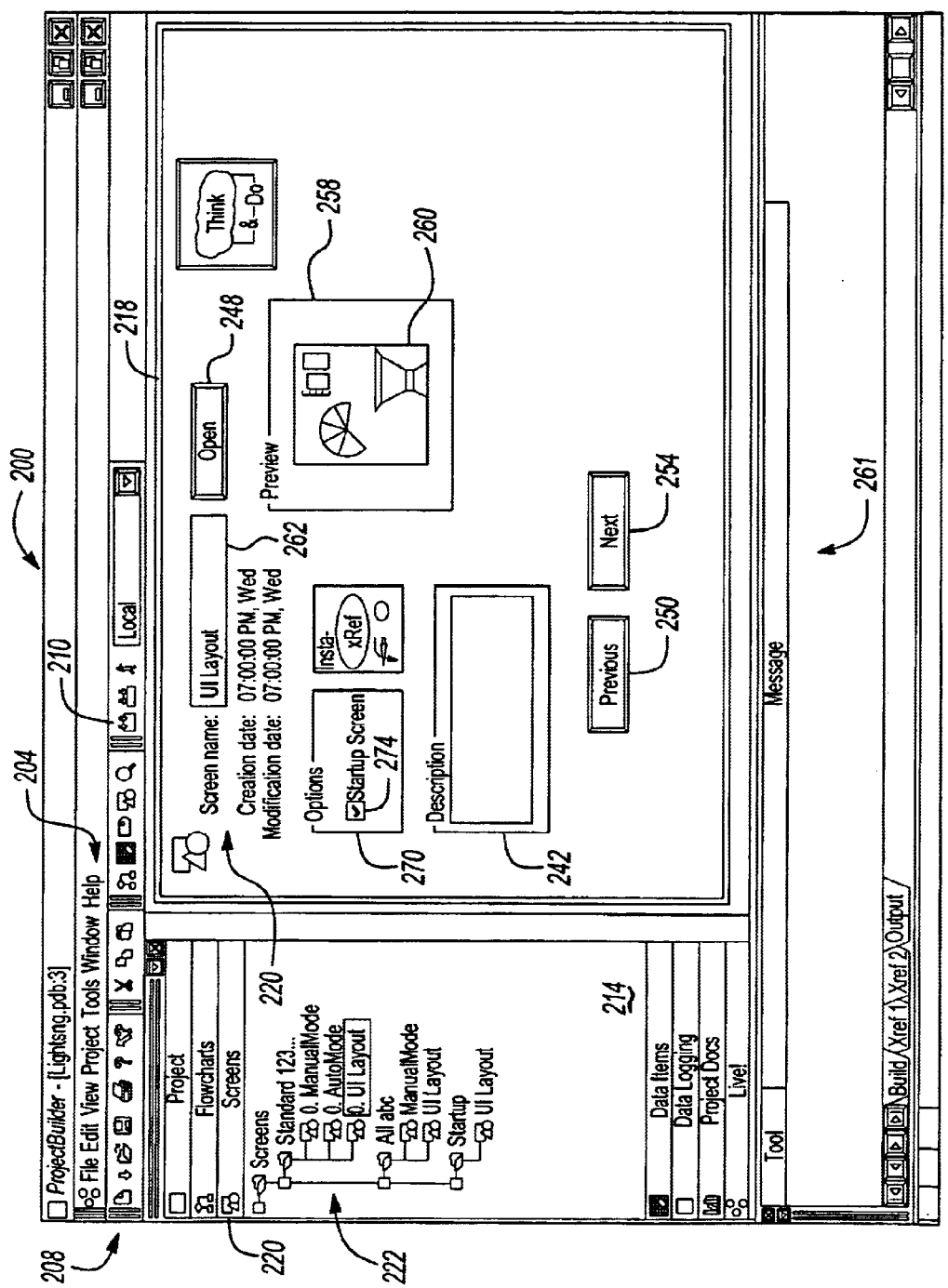
FIG. 6 illustrates a "Project screen" view of the project organization and dissemination module.

Referring now to FIG. 6, the project organization and dissemination system 200 provides a "Screen" view 261 when a user selects a screen command button 220 in the navigation frame 214. Reference numbers from FIG. 5 have been used where appropriate. A screen directory 222 for the selected project is shown and includes related folders and subfolders. The description frame 218 varies according to a selected view. When the screen view 218 is selected, the text boxes 220 change. A screen name text box 262 designates the selected screen name. An options frame 270 allows a user to pick a selected screen as a start up screen using a check box 274. The "Screen" view 261 is used to organize screens that are associated with the project.

Figure 7:
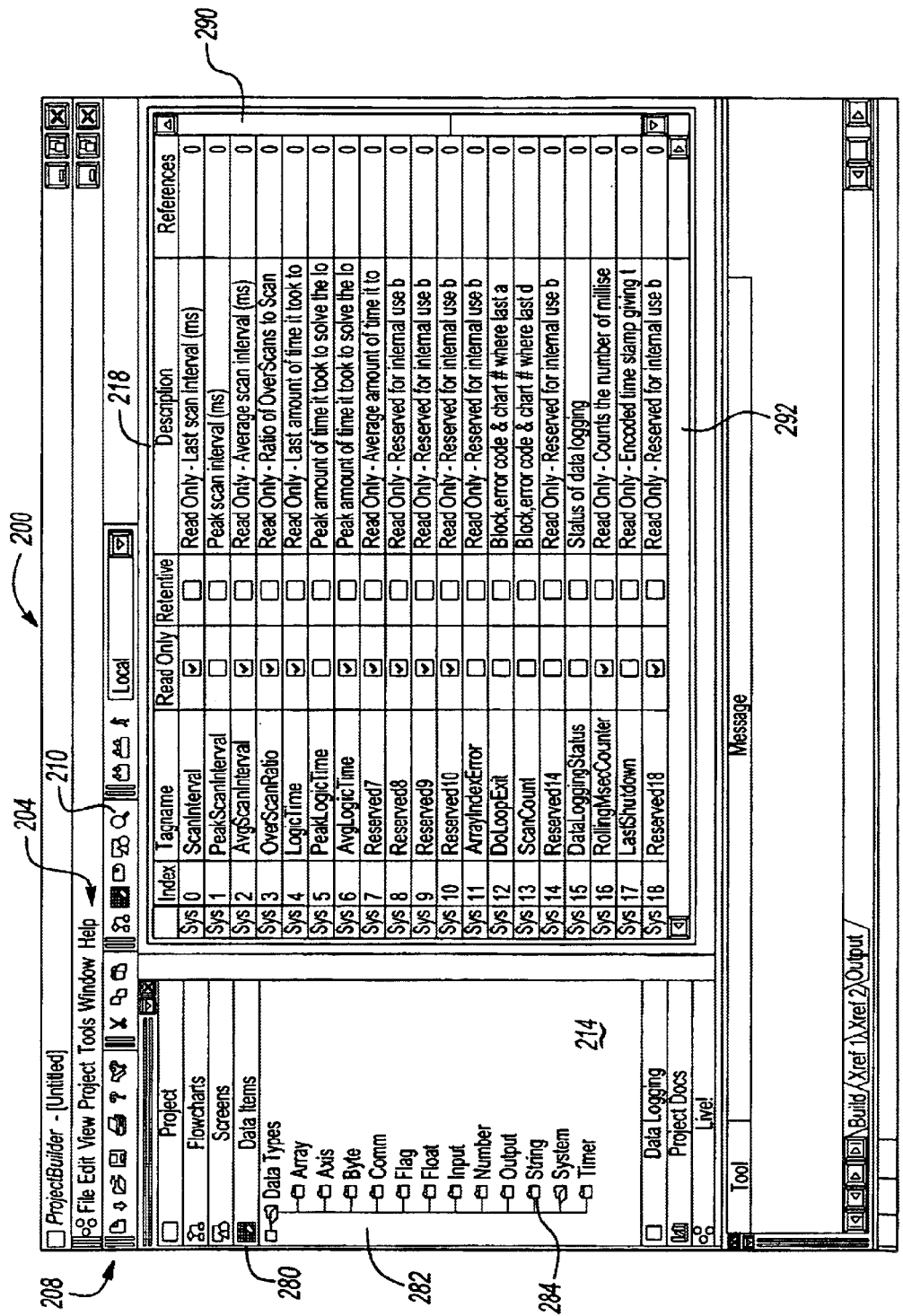
FIG. 7 illustrates a "Data Items" view of a project organization and dissemination module.

Referring now to FIG. 7, the project organization and dissemination system 200 includes a "Data Item" view that organizes data types that are associated with the selected projects. A "Data Items" command button 280 in the navigation frame 214 displays data type folders and subfolders such as array, axis, byte, flag, float, input, number, output, string, system and timer. When a user selects a data item using the keyboard 114 and/or a mouse 118, the data types associated with the subdirectory are displayed in the description box 218. A user is capable of modifying the system data type using check boxes, text boxes, drop down lists, or other suitable I/O interfaces in a conventional manner. One to more scroll bars 290, 292 allow a user to scroll through data types that are associated with the selected data type.

Figure 8:
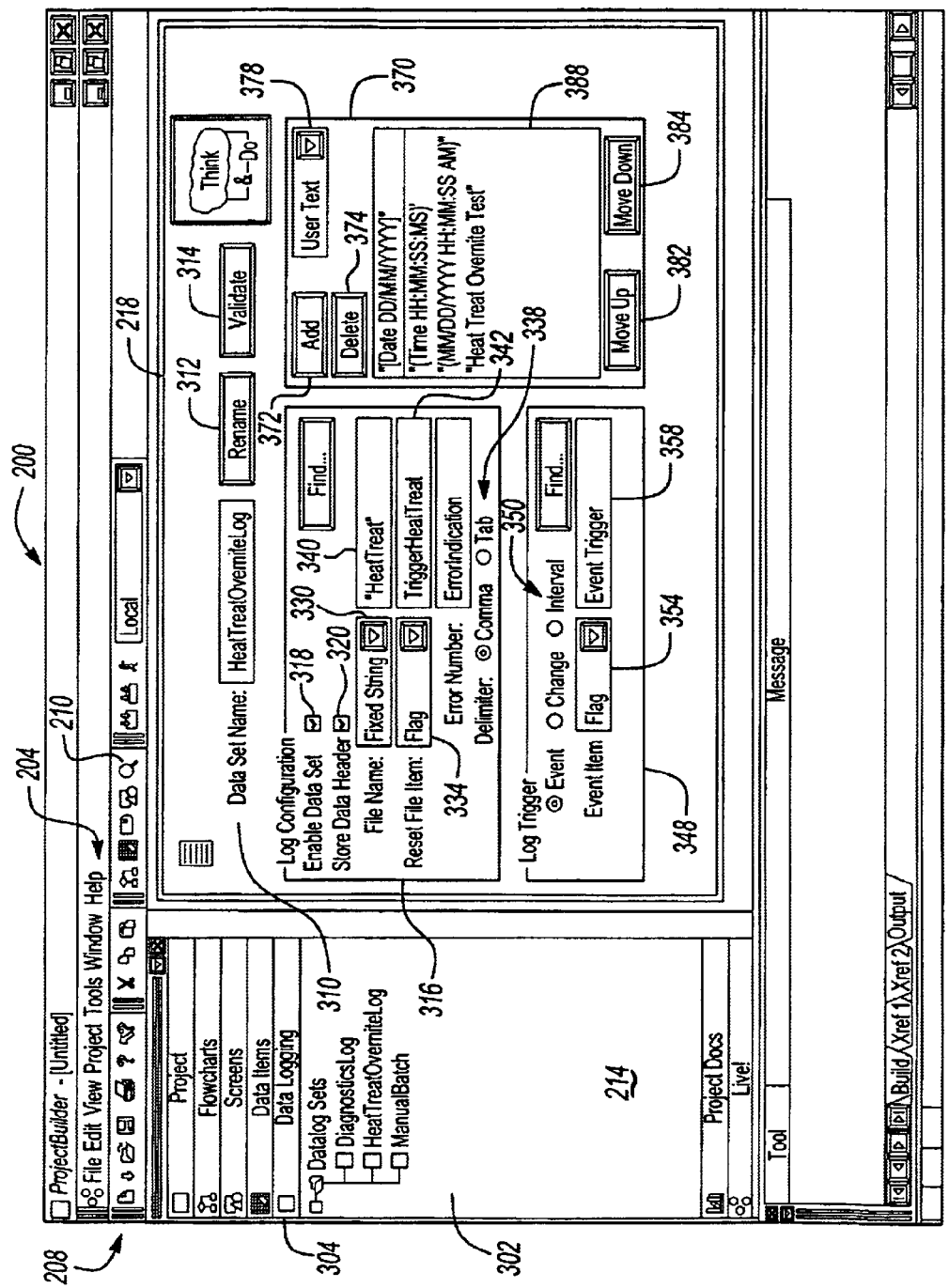
FIG. 8 illustrates a "Data Logging" view of the project organization and dissemination module.

Referring now to FIG. 8, the project organization and dissemination system 200 further includes a "Data Logging" view 302 that is selected using a data logging command button 304 in the navigation frame 214. The description frame 218 provides information for the selected data logging sets. A text box and frame 310 identifies a selected data set name. A command button 312 allows the data set name to be renamed. A command button 314 allows validation of the data set. A log configuration frame 316 includes a check box 318 for enabling a data set. A check box 320 allows a data header to be stored. Drop down list boxes 330 and 334 allows a user to set a file name and a reset file item. A radio button 338 allows a user to set the type of delimiter (comma and tab delimiters are provided). Other delimiters can also be used. A text box 340 allows a user to enter a file name. A text box 342 allows a user to set a reset file item name. A "Log Trigger" frame 348 includes a radio button 350 for selecting an event, a change, or an interval. A drop down list box 354 allows a user to select an event item. A text box 358 allows a user to input an event item name. A "Data Logging Items" frame 370 includes command buttons 372 and 374 for adding and deleting data logging items. A drop down list box 378 allows a user to select amongst different types of descriptive text. Command buttons 382 and 384 allow a user to navigate items displayed in a text box 388. The "Data Logging" view 302 organizes datalog sets.

Figure 9:
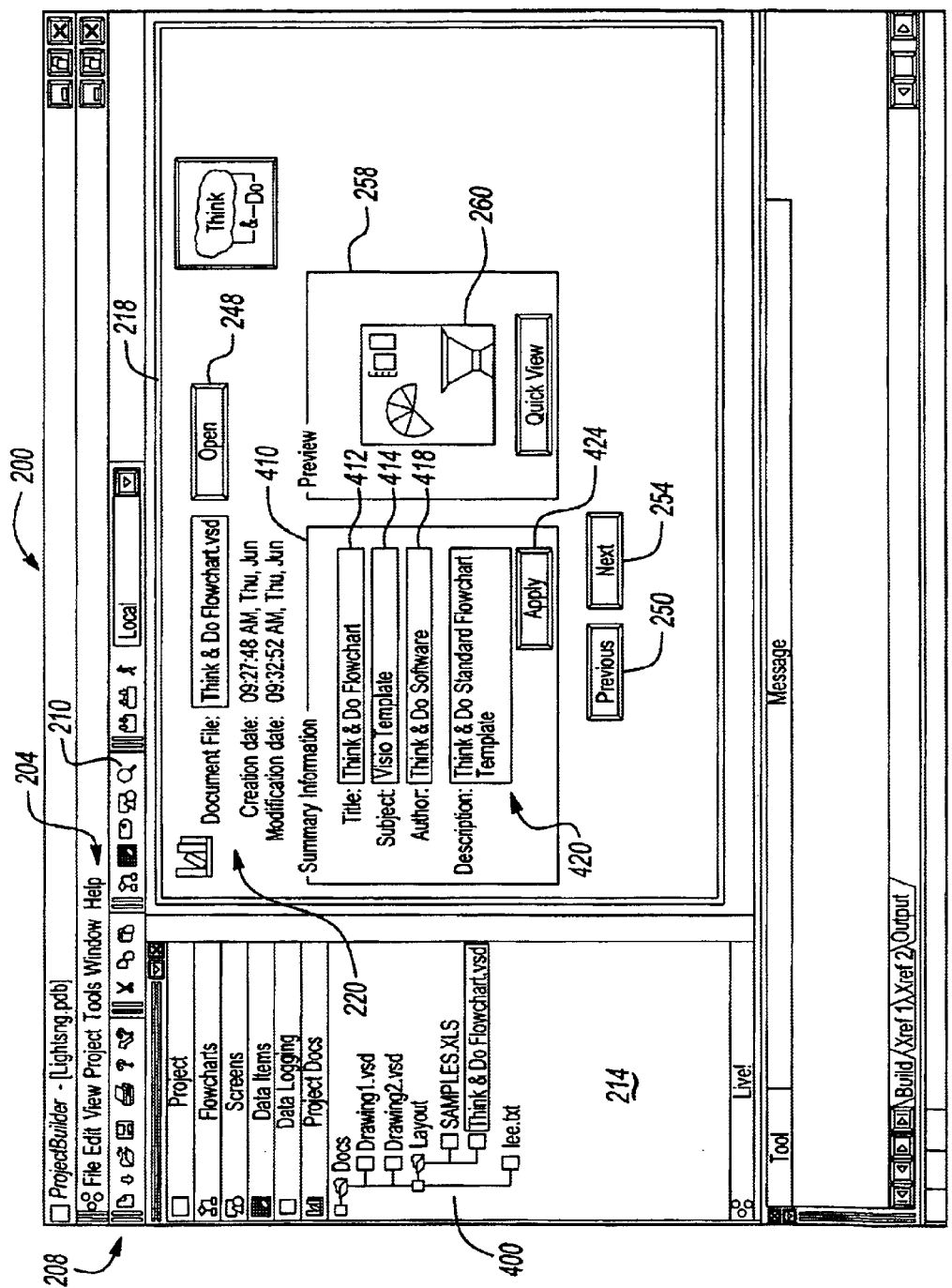
FIG. 9 illustrates a "Project Documents" view of the project organization and dissemination module.

Referring now to FIG. 9, the project organization and dissemination system 200 includes a "Project Documents" view 400 that is selected using a command button 402 in the navigation frame 214 and that contains a documents folder containing drawings and a layout subfolder. The text box and frame 220 identifies the selected document. The command button 248 allows a user to open the document. The summary information frame 410 contains a text box 412 for entering text for the title of the document, a text box 414 for entering subject information, a text box 418 for entering author information, and a description text box 420 for entering a description of the document. A command button 424 applies the summary information to the document.

Figure 10:
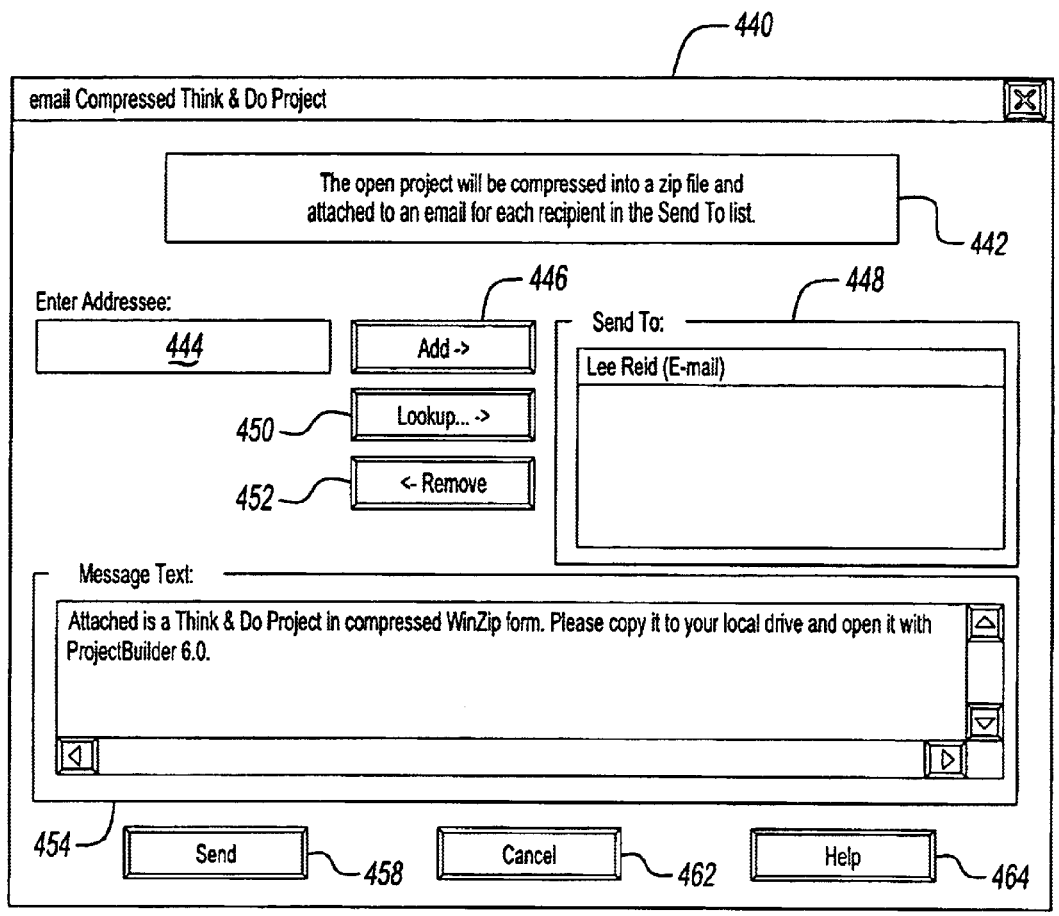
FIG. 10 illustrates a dialog box for sending compressed projects.

Referring now to FIG. 10, a transmit dialog box 440 is illustrated. The transmit dialog box 440 is launched using the tool 210 in the toolbar 208 and/or using the pull-down menu 204. The transmit dialog box 440 contains a frame 442 with instructions describing what will happen if the project is sent. A text box 444 allows a user to input an e-mail address for an addressee and/or the address of an FTP site provided by the web server 24. A command button 446 allows an entered addressee to be added to a "Send To:" frame 448. A command button 450 allows users to lookup an addressee in the contacts list 104 that is associated with the browser 102 or other contact-organizing software. A command button 452 allows a user to remove a selected addressee in the "Send To:" frame 448. A frame 454 allows a project participant to enter a text message that is included with the compressed project. A command button 458 allows a user to send the compressed project to the e-mail addresses identified in the "Send To:" frame 448. A command button 462 cancels sending the project. A command button 464 launches a help dialog box in a conventional manner.

As can be appreciated from the foregoing, the project organization and dissemination system according to the invention collects elements of a control project as a project is created and edited. The project organization and dissemination system allows the project to be compressed easily for transmission to other project participants, stored at a file transfer protocol site for easy downloads, etc.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A project organization and dissemination system for a machine programming and control system, comprising:
   a project development environment that includes project tools for designing project elements, wherein said project tools include a control logic module that generates and edits flowchart project elements that include flowchart blocks and that contain control logic for operating a device to further a process;
   a project archival system that communicates with a distributed communications system and that stores said project elements; and
   a web enabled device that communicates with said distributed communications system and that allows remote access to said project elements.

2. The project organization and dissemination system of claim 1 wherein said project tools further include an operator screen design module for designing human machine interface (HMI) project elements.

3. The project organization and dissemination system of claim 1 wherein said project tools further include a database design module that adds, inserts, deletes and queries database project elements using data generated by said flowchart project elements.

4. The project organization and dissemination system of claim 1 wherein said project tools further include a network design module for designing network layout project elements.

5. The project organization and dissemination system of claim 1 wherein said project tools further include a machine design module for designing at least one of electrical and electromechanical device project elements.

6. The project organization and dissemination system of claim 1 wherein said project tools further include a work area layout module for preparing spatial arrangement project elements for devices, materials, and other objects.

7. The project organization and dissemination system of claim 1 wherein said project tools further include a process flow module for creating process logic and flow project elements.

8. The project organization and dissemination system of claim 1 wherein said project tools further include a facilities layout module for creating facility layout and design project elements.

9. The project organization and dissemination system of claim 1 wherein said project tools further include a simulation module that creates simulation project elements that simulate process inputs and outputs to test the control logic.

10. The project organization and dissemination system of claim 1 further comprising a document manager that restricts access to said project elements using a security protocol.

11. A method of providing a project organization and dissemination system for a machine programming and control system, comprising:

providing project tools for designing project elements in a project development environment, wherein said project tools include a control logic module that generates and edits flowchart project elements that include flowchart blocks and that contain control logic for operating a device to further a process;

providing a project archival system that communicates with a distributed communications system;

storing said project elements in said project archival system; and using a web enabled device to remotely access said project elements through said distributed communications system.

12. The method of claim 11 further comprising:

providing an operator screen design module for designing human machine interface (HMI) project elements to assist an operator; and storing said HMI project elements in said project archival system.

13. The method of claim 11 further comprising:

providing a database design module that adds, inserts, deletes and queries database project elements using data generated by said flowchart project elements; and storing said database project elements in said project archival system.

14. The method of claim 11 further comprising:

providing a network design module for designing network layout project elements; and storing said network layout project elements in said project archival system.

15. The method of claim 11 further comprising:

providing a machine design module for designing at least one of electrical and electromechanical device project elements; and storing said device project elements in said project archival system.

16. The method of claim 11 further comprising:

providing a work area layout module for preparing spatial arrangement project elements for devices, materials, and other objects; and storing said spatial arrangement project elements in said project archival system.

17. The method of claim 11 further comprising:

providing a process flow module for creating process logic and flow project elements; and storing said process logic and flow project elements in said project archival system.

18. The method of claim 11 further comprising:

providing a facilities layout module for creating facility layout and design project elements; and storing said facility layout and design project elements in said project archival system.

19. The method of claim 11 further comprising:

providing a simulation module that creates simulation project elements that simulate process inputs and outputs to test the control logic; and storing said simulation project elements in said project archival system.

20. The method of claim 11 further comprising limiting access to said project elements by said web enabled device using a security protocol.

* * * * *